Patented July 3, 1923.

1,460,606

UNITED STATES PATENT OFFICE.

KURT RIPPER, OF VIENNA, AUSTRIA, ASSIGNOR TO FRITZ POLLAK, OF VIENNA, AUSTRIA.

PROCESS FOR MANUFACTURING CONDENSATION PRODUCTS.

No Drawing.   Application filed September 9, 1922. Serial No. 587,221.

*To all whom it may concern:*

Be it known that I, KURT RIPPER, a citizen of the Republic of Austria, and residing at 6 Bleichergasse, Vienna, Austria, have invented certain new and useful Improvements in a Process for Manufacturing Condensation Products, for which I have made application for foreign patents, as follows: Austria, filed 31st May, 1921; Germany, filed 28th October, 1921; Great Britain, filed 30th May, 1922; Switzerland, filed 20th May, 1922; Czechoslovakia, filed 20th May, 1922; Hungary, filed 12th July, 1922, and of which the following is a specification.

The invention relates to the manufacture of condensation products obtained by the reaction of formaldehyde on an urea.

The condensation products initially yielded by the reaction between these substances are soluble in water, but when treated by heat, are converted after a period of time into intermediate products considerably less soluble in water, and finally into products wholly insoluble therein. All these products could be used for a variety of technical applications, but there is a great hindrance to that in the fact, that the viscosity of the initial condensation products, which flow easily at first, increases of its own accord after being left a short time at the ordinary temperature, the solutions finally becoming gelatinized. This gelatinization is irreversible, as the gelatinized solutions cannot be brought back to their initial state. Therefore these solutions are mostly unsuitable for practical purposes. This disadvantage is, without exception, inherent in all solutions of this kind, whether or not condensing agents had been used in the course of the first stage of the reaction; all these solutions are sooner or later converted into irreversible gelatinous masses (gels).

Now I have found that the gelatinization of the initial products of condensation, soluble in water, may be retarded by the addition of salts showing alkaline reaction on hydrolysis. The salts especially appropriate for this purpose are the salts of strong bases with weak acids, for instance alkali-metal salts or alkaline-earth-metal salts of organic carboxylic acids or of weak inorganic acids, the action of these two classes of salts being however not entirely the same. The retardation of gelatinization depends upon the nature and the quantity of the retarding agents, so that for instance a large quantity of sodium acetate acts like a small quantity of sodium borate. There is however a limit to quantity, beyond which there is no essential alteration in the action of the salt.

Only by this means one can succeed in manufacturing durable solutions of the condensation products, soluble in water; it thus became possible, to place these solutions on the market as fit for being used in industry.

Furthermore the addition of retarding salts has the advantage of slowing down the subsequent hardening of the material when treated by heat, so that a smaller proportion of defective products will be made, than by the processes heretofore in use. Moreover, it is just and only by this retarding action, that the possibility is given of fully controlling the reaction, as without the addition of such retarding salts gelatinization takes place so rapidly, that a uniform and industrial production is precluded and a subsequent treatment of the products obtained is impossible, especially when substances free from water are to be treated.

The stabilized solutions may be first gelatinized and after any convenient time rendered insoluble by heating, or they may be rendered insoluble by heating in one continuous operation.

Finally I have found, that the gelatinization of the initial condensation products, stabilized in such manner, may be accelerated by the addition of compounds, the watery solution of which contains a great proportion of free anions. Especially the salts of strong acids, such as for instance sulphates, chlorates, chlorides, nitrates and the like have an accelerating action, so that, when using them, the gelatinization of the stabilized material may be effected much quicker than would be the case without such addition. The material may then, at any time, when required, be rendered insoluble by heating, or else the stabilized initial condensation products, after the addition of accelerating salts, may be brought by one continuous heating operation to the final state of hardness and insolubility.

The stabilized condensation products, which are still soluble in water, may be used for manufacturing lacquers, impregnating agents, waterproof coating material and the like. The solutions are also suitable for the manufacture of moulded articles either by superimposing several layers of lacquer or by casting or pressing when a thicker article is to be made. It is advantageous in many cases to mix the material while fluid with powdery, fibrous, cellular, or porous substances of various kinds or to impregnate pieces of porous substances with the said fluid material which only thereafter is suitably hardened. Finally, this fluid material may be used as a filler or binder alone or mixed with filling substances for casting hollow articles, for use as a packing material for preserve containers or glass receptacles or for gluing together fragments of articles of any material. Products with the transparency of water are most suitable for repairing broken articles of glass or porcelain.

The hard material, resulting as the insoluble final product, is well suited for being worked on the lathe, sawed, bored, filed, polished, stamped or treated in any other mechanical way.

The reagent substances may be used in various proportions as shown by the following examples of carrying out the process:

1. 60 parts by weight of urea, 150 parts by weight of formaldehyde (solution containing 40% by volume) and 6 parts by weight of hexamethylenetetramine are heated under reflux in a water bath until test samples do not become cloudy when cooling down. A mixture is thereafter prepared by mixing together 100 parts by weight of the product thus obtained with 0.7 parts by weight of sodium acetate dissolved in a small quantity of water. This solution represents a fluid lacquer solution which will keep for a long time in this form.

2. A stabilized, highly viscous and highly concentrated intermediate product may be produced for instance by evaporating in a vacuum, 100 parts by weight of the initial condensation material until 20 to 30% of water is distilled out of the total weight, the product thus obtained being mixed with two parts of sodium valerianate dissolved in a small quantity of water. This solution also remains stable for a long time and can be mixed with water in any proportion. Borax solution as a retarding agent is particularly important in case a mixture of the condensation products is to be used, mixed with shellac.

3. A stabilized highly viscous intermediate product as dilute as possible may be produced by leaving the condensation product made according to example 1, to stand in the cold and without any further addition until the desired degree of viscosity is reached, two parts of sodium acetate being then added. The viscosity is slightly lowered thereby, but then remains unaltered for a long time.

4. 100 parts by weight of the intermediate product stabilized by means of sodium acetate as set forth in example (1) are evaporated in vacuum at a temperature not exceeding 45° until water is expelled to the utmost possible extent, the material being thereafter cast in moulds and by heating to 70–90°, can be transformed into a product insoluble in water and having the transparency of glass.

5. To 100 parts by weight of the condensation product obtained according to example (1), one part of potassium sulphate (or potassium nitrate or potassium chloride or potassium chlorate or potassium iodide or potassium sulphocyanate, etc.) is added. Gelatinization sets in after a short time. The gelatinous mass being allowed to stand, water begins to separate therefrom. The material may now be hardened by carefully heating.

I wish it to be understood that I do not desire to be limited to the exact details described, for obvious modifications will occur to a person skilled in the art.

I claim:

1. The process for manufacturing condensation products from an urea with formaldehyde which consists in retarding the gelatinization of the initial condensation products soluble in water by the addition of salts showing alkaline reaction on hydrolysis.

2. The process for manufacturing condensation products from an urea with formaldehyde which consists in retarding the gelatinization of the initial condensation products soluble in water by the addition of salts of strong bases with weak acids.

3. The process for manufacturing condensation products from an urea with formaldehyde which consists in retarding the gelatinization of the initial condensation products soluble in water by the addition of alkali salts of weak acids.

4. The process of manufacturing condensation products from an urea with formaldehyde which consists in retarding the gelatinization of the initial condensation products soluble in water by the addition of alkali salts of organic carboxylic acid.

5. The process for manufacturing condensation products from an urea with formaldehyde which consists in retarding the gelatinization of the initial condensation products soluble in water by the addition of sodium acetate.

6. The process for manufacturing condensation products from an urea with formaldehyde which consists in evaporating the initial condensation product in a vacuum, the material thus obtained being mixed with a salt showing alkaline reaction on hydrolysis, which salt is dissolved in a small quantity of water.

7. The process for manufacturing condensation products from an urea with formaldehyde which consists in retarding the gelatinization of the initial condensation products soluble in water by the addition of salts showing alkaline reaction on hydrolysis and gelatinizing the product by heating.

8. The process for manufacturing condensation products from an urea with formaldehyde which consists in retarding the gelatinization of the initial condensation products soluble in water by the addition of salts showing alkaline reaction on hydrolysis, gelatinizing the product by heating and hardening the same.

9. The process for manufacturing condensation products from an urea with formaldehyde which consists in treating the initial condensation material stabilized by means of a salt showing alkaline reaction on hydrolysis in a vacuum at a temperature not exceeding 45 degrees centigrade, until water is expelled to the utmost possible extent, casting the material in moulds and then transforming it by heating up to 90 degrees centigrade into a product insoluble in water and having the transparency of glass.

10. The process for manufacturing condensation products from an urea with formaldehyde which consists in retarding the gelatinization of the initial condensation products soluble in water by the addition of salts showing alkaline reaction on hydrolysis, adding compounds accelerating the gelatinization and hardening the gelatinized products by heating.

11. The process for manufacturing condensation products from an urea with formaldehyde which consists in retarding the gelatinization of the initial condensation products soluble in water by the addition of salts showing alkaline reaction on hydrolysis, adding compounds the watery solution of which contains a great proportion of free anions and hardening the gelatinized products by heating.

12. The process for manufacturing condensation products from an urea with formaldehyde which consists in retarding the gelatinization of the initial condensation products soluble in water by the addition of salts showing alkaline reaction on hydrolysis, adding salts of strong acids and hardening the products by heating.

13. The initial condensation products soluble in water obtained by reacting with formaldehyde upon an urea and stabilized by the addition of salts showing alkaline reaction on hydrolysis, which products are applicable for manufacturing lacquers, filling materials, moulded articles, impregnating and gluing means and waterproof coating materials.

In testimony whereof I have affixed my signature in presence of two witnesses.

KURT RIPPER.

Witnesses:
KARL SONDENBERG,
JOSEF GURMANN.